United States Patent [19]
de Jong et al.

[11] Patent Number: 4,805,741
[45] Date of Patent: Feb. 21, 1989

[54] ELEVATOR BRAKE

[75] Inventors: Johannes de Jong, Järvenpää; Jouko Perttula, Hyvinkää, both of Finland

[73] Assignee: Kone Elevator GmbH, Baar, Switzerland

[21] Appl. No.: 23,274

[22] Filed: Mar. 9, 1987

[30] Foreign Application Priority Data

Mar. 10, 1986 [FI] Finland ................ 860983

[51] Int. Cl.$^4$ .............. F16D 66/00; B66B 7/00
[52] U.S. Cl. .................. 188/1.11; 188/2 A; 187/20; 187/108
[58] Field of Search ............ 187/20, 27, 28, 108; 188/1.11, 2 A, 75, 162; 303/112; 73/121

[56] References Cited

U.S. PATENT DOCUMENTS

| | | | |
|---|---|---|---|
| 3,782,185 | 1/1974 | Hassenauer et al. | 73/121 |
| 4,023,655 | 3/1977 | Anzai et al. | 188/162 X |
| 4,306,637 | 12/1981 | Keiser et al. | 188/75 X |
| 4,688,660 | 8/1987 | Kaneko | 187/20 |

FOREIGN PATENT DOCUMENTS

| | | |
|---|---|---|
| 563534 | 8/1944 | United Kingdom . |
| 713538 | 8/1954 | United Kingdom . |
| 1044870 | 10/1966 | United Kingdom . |
| 2031593 | 4/1980 | United Kingdom . |
| 1567138 | 5/1980 | United Kingdom . |

*Primary Examiner*—H. Grant Skaggs
*Assistant Examiner*—Nils E. Pedersen
*Attorney, Agent, or Firm*—Sughrue, Mion, Zinn, Macpeak and Seas

[57] ABSTRACT

A torque-responsive brake, in particular for elevators, comprises two or more brakes arcs, brake shoes pivotally connected to the brake arcs and having attached brake linings and a brake actuating mechanism for pressing the brake linings against a drum. With prior art brakes, the starting of the elevator was not smooth enough or, alternatively, the types of apparatus by which smooth starting has been achieved were too complicated and expensive. By the present invention these drawbacks have been overcome in that, for pivotally attaching each brake shoe to its brake arc, a pivot shaft extends through the respective brake shoe and is connected to one end of a torque-responsive member, the opposite end of which is fixed to the respective brake arc.

4 Claims, 2 Drawing Sheets

ELEVATOR BRAKE

FIELD OF THE INVENTION

The present invention relats to a torque-responsive brake, which is particularly useful for elevators, comprising a brake drum, two or more brake arcs, and brake shoes pivotally attached to the brake arcs and which press against the drum through brake linings secured to the brake shoes, and a brake mechanism for effecting such pressing as well as release of the brake shoes from the drum.

DESCRIPTION OF THE PRIOR ART

In the prior art, elevators have been provided with means for measuring load or torque which were disposed either on a elevator cage, on its side or under the base of the elevator machinery. All these load measuring means, or weighing means as they are also called, have the drawback that they cannot account for the friction in the elevator shaft. The torque of the drive meter, which is based on data representing the magnitude of the load, supplied by these means, is therefore always different from the torque which is really required. Moreover, the torque values of the motor tend to change as the motor ages, and by the effect of the ambient temperature, whereby the starting torque of the motor does not obtain its correct value.

A more proper way is to measure the required starting moment on the brake just before the brake opens. If the brake is released at the exact moment when the sum of the torques acting on both brake shoes is exactly zero, the motor is in exact equilibrium in the system constituted by elevator cage and its counterweight, in which case the starting of the elevator is effected as smoothly as possible.

The brake means just described has been developed and patented by a Swiss company, namely Schindler AG. However, means disclosed in a patent assigned to Schindler is very complicated in respect of its construction. The means is, moreover, subject to the drawback that it cannot be installed in an existing brake structure.

BRIEF SUMMARY OF THE INVENTION

It is an object of the present invention to provide a torque-responsive brake by which the starting of an elevator can be made as smooth as possible and which is nevertheless of simple construction and inexpensive to manufacture.

According to the present invention, there is provided a torque-responsive brake comprising a brake drum, at least two brake arcs, brake shoe carried by respective ones of the brake arcs, the brake shoes having attached thereto brake linings, brake actuator means for urging the brake linings into braking engagement with the brake drum and for releasing the brake linings from the brake drum, means for pivotally connecting each of the brake shoes to its respective brake arc, the pivotal connection means comprising a pivot shaft extending through the respective brake shoe, and torque-responsive means connected to each of the brake shoes and to the respective pivot shaft for providing a signal representing the torque in the brake.

The torque-responsive means comprises a torque-responsive member, the respective shaft extending through a first end of the torque-responsive member and screw means for securing an opposite end of the torque-responsive member to the respective brake arc, whereby the torque-responsive member serves as a lever and the first end thereof is deflectable within small limits in a vertical direction.

Means are provided for measuring the deflection of the torque-responsive member, and the deflection measuring means comprise strain gauges at opposite sides of the torque-responsive member.

An important advantage afforded by the brake of the present invention is that, when it is employed in an elevator, the starting torque of the elevator motor can at all times be made exactly equal to the required torque. Furthermore, the torque-responsive means is easy to install on existing brakes by replacing the brake arcs. An advantage may also be seen in the simplicity and low price of the torque-responsive means and in the fact that even when faults appear, the torque- responsive means is safe; the brake is not released if the required motor starting torque cannot be produced.

BRIEF DESCRIPTION OF THE DRAWINGS

The invention is described in detail in the following, with reference to the drawings hereto attached, wherein.

DESCRIPTION OF THE PREFERRED EMBODIMENT

Figure 1:
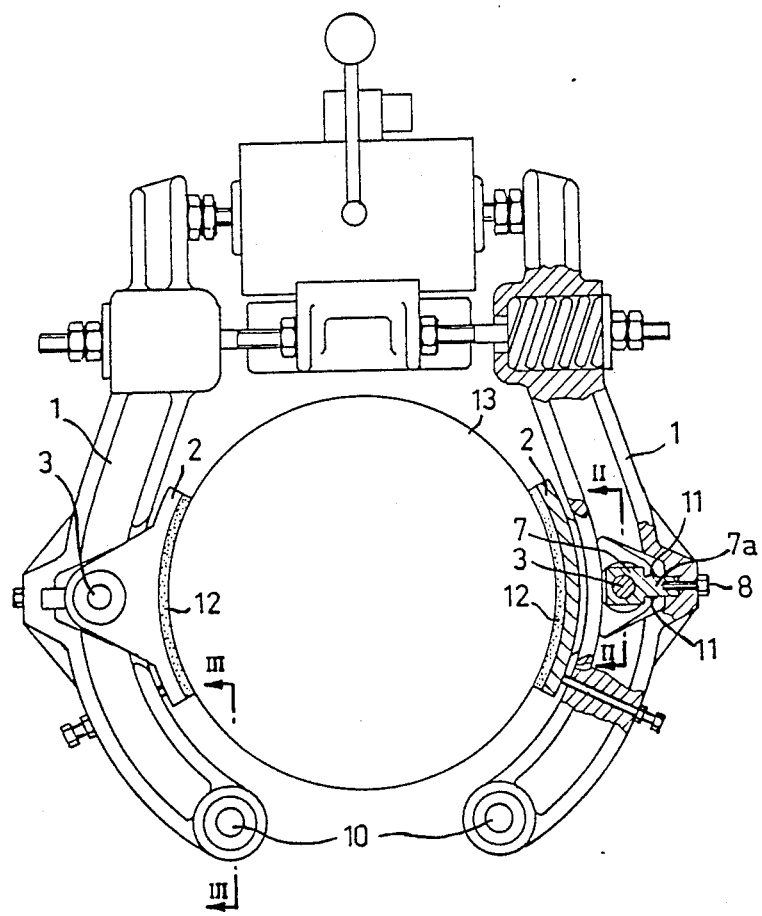
FIG. 1 shows a brake means according to the invention in elevational view.
Figure 2:
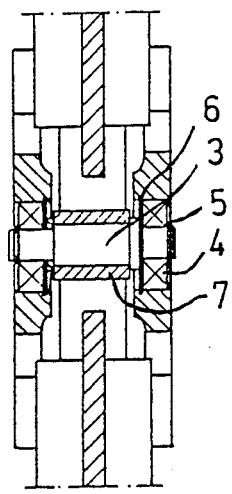
FIG. 2 shows a section along line II—II in FIG. 1.
Figure 3:
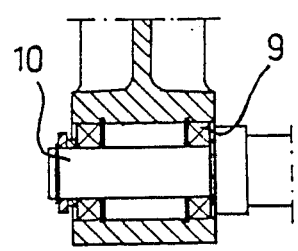
FIG. 3 shows a section along line III—III in FIG. 1.
Figure 4:
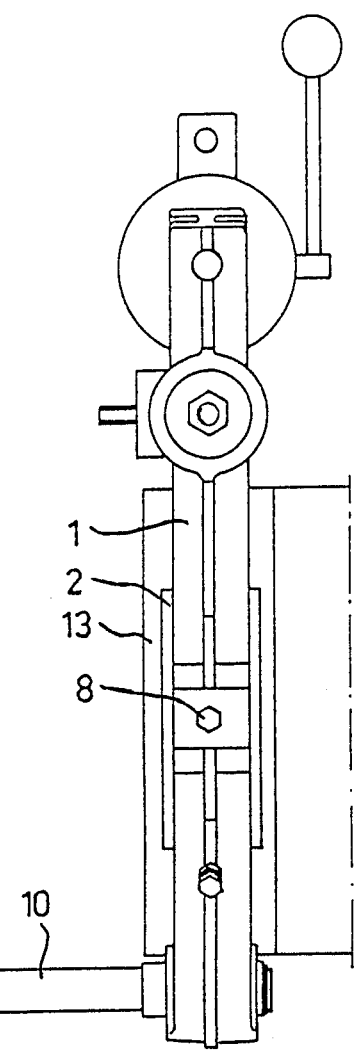
FIG. 4 shows in side elevation the brake means of FIG. 1, seen from the left as viewed in FIG. 1.

Referring now to the drawings, the brake means itself is a conventional brake employed on elevators, in which brake arcs 1 have pivotally attached to them brake shoes 2, to which have been affixed brake linings 12, which act on a drum 13. Each such pivotal attachment is provided by means of an assembly of a shaft 3, a bearing 4 and circlips 5 and 6. According to the present invention, one end of a measuring member 7 is also carried on the same shaft. Error factors potentially occurring in the measurement are eliminated by this pivotal attachment. Each measuring member 7 is attached by its other end to the respective brake arc 1 by a securing screw 8 so that the measuring member 7 constitutes a lever of which the end connected to the shaft 3 may move slightly in the vertical direction and may thus cause stresses in a shank part 7a of the measuring member.

The bearings 4 on the shaft 3 are antifriction bearings. In order to minimize friction in the lever and arc components of the whole brake apparatus, the brake arcs 1 are carried at their lower ends by antifriction bearings 9 on their pivot pins 10 (FIG. 1).

The measuring element proper consists of strain gauge pick-ups 11 which have been placed on opposite sides of the shank part 7a of each measuring member 7. The signals obtained from the strain gauge pick-ups of the measuring members are amplified and added, whereafter the signals are further processed in a logics unit (not shown in the drawings). On the basis of the information thus obtained, the brake is not released until the torque resulting from the load is zero.

It is obvious to a person skilled in the art that the invention is not confined to the embodiment thereof presented by way of example in the foregoing description of the drawings and that it may instead be varied within the scope of the appended claims.

I claim:

1. A torque-responsive brake comprising:
    a brake drum;
    at least two brake arcs;
    brake shoes carried by respective ones of said brake arcs;
    said brake shoes having attached thereto brake linings;
    brake actuator means for urging said brake linings into braking engagement with said brake drum and for releasing said brake linings from said brake drum;
    means for pivotally connecting each of said brake shoes to its respective brake arc;
    said pivotal connection means comprising a pivot shaft extending through the respective brake shoe; and
    torque-responsive means connected directly between each of said brake arcs and the respective pivot shafts for providing signals representing the torque in said brake.

2. A torque-responsive brake comprising: a brake drum,
    at least two brake arcs,
    brake shoes carried by respective ones of said brake arcs,
    said brake shoes having attached thereto brake linings,
    brake actuator means for urging said brake linings into braking engagement with said brake drum and for releasing said brake linings from said brake drum,
    means for pivotally connecting each of said brake shoes to its respective brake arc,
    said pivotal connection means comprising a pivot shaft extending through the respective brake shoe, and
    torque-responsive means connected to each of said brake arcs and to the respective pivot shafts for providing signals representing the torque in said brake;
    wherein said torque-responsive means comprises a torque-responsive member, the respective shaft extending through a first end of said torque-responsive member, and fastening means for securing an opposite end of said torque-responsive member to the respective brake arc, whereby said torque-responsive member serves as a lever and said first end thereof is deflectable within small limits in a vertical direction.

3. A torque-responsive brake as claimed in claim 2, wherein means are provided for measuring the deflection of said torque-responsive member.

4. A torque-responsive brake as claimed in claim 3, wherein said deflection measuring means comprise strain gauges at opposite sides of said torque-responsive member.

* * * * *